US000001316H

United States Statutory Invention Registration [19]

[11] Reg. Number: H1316

McGuinness

[43] Published: Jun. 7, 1994

[54] DISPOSABLE GAS AND TOXIC FUME MASK

[75] Inventor: Daniel B. McGuinness, Beavercreek, Ohio

[73] Assignee: The United States of America as represented by the Secretary of the Air Force, Washington, D.C.

[21] Appl. No.: 11,638

[22] Filed: Feb. 1, 1993

[51] Int. Cl.[5] ..... A62B 7/10; A62B 17/04; A62B 18/00; A62B 23/02

[52] U.S. Cl. ..... 128/201.25; 128/201.15; 128/201.23

[58] Field of Search ..... 128/201.19, 201.22–201.26, 128/201.28, 206.12, 206.15, 206.17

[56] References Cited

U.S. PATENT DOCUMENTS

| | | | |
|---|---|---|---|
| 2,702,089 | 2/1955 | Engelder | 128/205.27 |
| 4,154,235 | 5/1979 | Warncke | 128/201.25 |
| 4,458,680 | 7/1984 | Childers et al. | 128/201.29 |
| 4,614,186 | 9/1986 | John | 128/201.25 |
| 4,637,383 | 1/1987 | Lopez | 128/201.25 |
| 4,764,990 | 8/1988 | Markert | 128/201.15 |
| 4,998,529 | 3/1991 | Werjefelt | 128/201.13 |
| 5,003,974 | 4/1991 | Mou | 128/201.25 |
| 5,040,530 | 8/1991 | Bauer et al. | 128/201.25 |
| 5,056,512 | 10/1991 | Bower et al. | 128/201.25 |
| 5,113,854 | 5/1992 | Dosch et al. | 128/201.23 |
| 5,115,804 | 5/1992 | Brookman | 128/201.23 |
| 5,119,808 | 6/1992 | Marquardt et al. | 128/201.22 |
| 5,140,980 | 8/1992 | Haughey et al. | 128/201.25 |
| 5,186,165 | 2/1993 | Swann | 128/201.25 |

FOREIGN PATENT DOCUMENTS 2141349 12/1984 United Kingdom ..... 128/205.27

OTHER PUBLICATIONS

Avon Industrial Polymers Limited, NBCS10, New General Service Respirator, 4 sheets.

*Primary Examiner*—David H. Brown
*Attorney, Agent, or Firm*—Bobby D. Scearce

[57] ABSTRACT

A disposable respiratory protective gas and toxic fume mask is described which comprises a transparent hood of thin film chemical resistant material sealable at the neck or to the face of a subject and covering the eyes, nose and mouth, a filter in the hood for filtering and conducting air into the hood, a tube interconnecting the filter and a mouthpiece and including a first one-way valve for conducting filtered air to the subject, a second one-way valve in the mouthpiece for conducting exhaled air air into the interior of the hood and thereby generating an overpressure condition within the hood.

13 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DISPOSABLE GAS AND TOXIC FUME MASK

RIGHTS OF THE GOVERNMENT

The invention described herein may be manufactured and used by or for the Government of the United States for all governmental purposes without the payment of any royalty.

BACKGROUND OF THE INVENTION

The present invention relates generally to devices for respiratory protection in contaminated environments, and more particularly to a protective mask having a transparent hood with filter 10 and one-way valving structure which provides a positive pressure inside the mask and prevents the ingestion of contaminants.

Prior art protective masks generally require external air sources for delivering air under pressure into the masks. In the valving structure of the invention, the user ingests air through a filter and first one-way valve and exhales through a second one-way valve which maintains positive pressure inside the mask. Excess pressure escapes around the peripheral seal or through a low resistance one-way valve. The valving arrangement of the invention minimizes the dead space volume of air which may be rebreathed with negative physiological impact.

It is therefore a principal object of the invention to provide a chemical and toxic fume mask for personal respiratory protection against noxious and contaminated environments.

It is another object of the invention to provide a protective respiratory mask effective against substantially all known nerve and blister agents.

It is a further object of the invention to provide an inexpensive, disposable respiratory protection mask.

It is another object of the invention to provide a respiratory protective mask sized for substantially universal personnel fit.

It is another object of the invention to provide a respiratory Protective mask having substantial (high) protection factor.

It is yet another object of the invention to provide a respiratory protective mask which is easily and quickly donned.

It is another object of the invention to provide a respiratory protective mask having a long shelf storage life and which is sufficiently compact and portable to be carried on the person.

These and other objects of the invention will become apparent as a detailed description of representative embodiments proceeds.

SUMMARY OF THE INVENTION

In accordance with the foregoing principles and objects of the invention, a disposable respiratory protective gas and toxic fume mask is described which comprises a transparent hood of thin film chemical resistant material sealable at the neck or to the face of a subject and covering the eyes, nose and mouth, a filter in the hood for filtering and conducting air into the hood, a tube interconnecting the filter and a mouthpiece and including a first one-way valve for conducting filtered air to the subject, a second one-way valve in the mouthpiece for conducting exhaled air air into the interior of the hood and thereby generating an overpressure condition within the hood.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
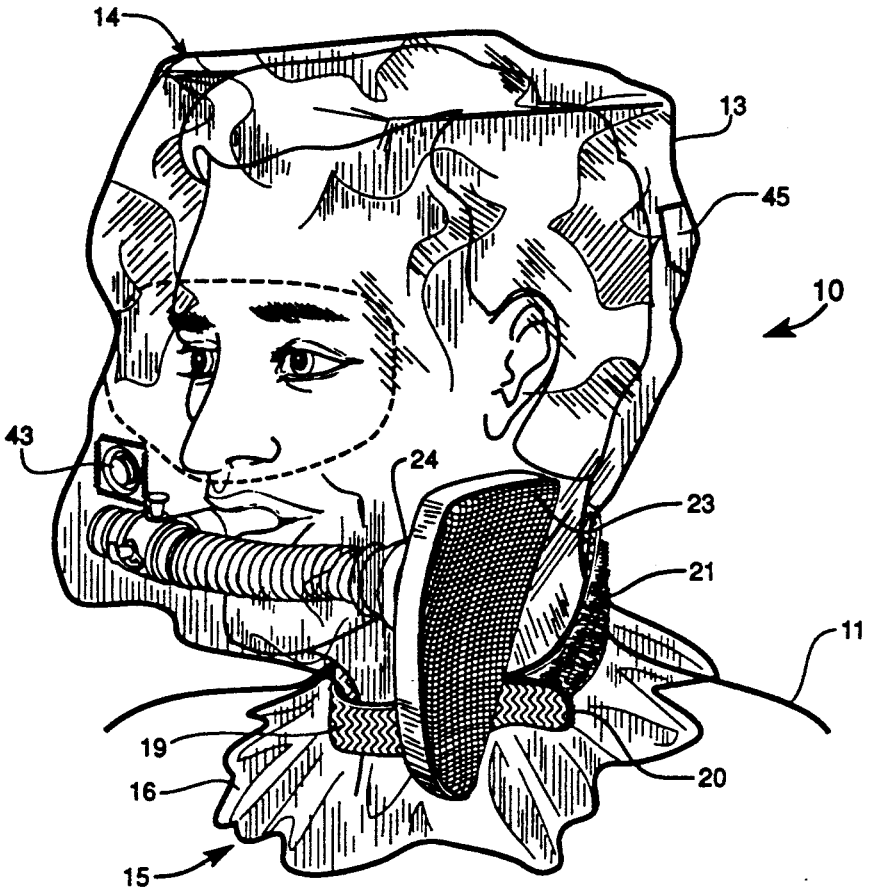
FIG. 1 is a perspective view of a representative embodiment of the invention as worn by a subject.

Referring now to the drawings, FIG. 1 is a perspective view a representative embodiment of a disposable respiratory protection mask 10 according to the invention as worn by subject 11. In accordance with a governing principle of the invention, the protective mask of the invention includes a transparent, thin film, chemically resistant covering over and peripherally sealed around the eyes, nose and mouth of subject 11. Accordingly, in the FIG. 1 embodiment, mask 10 may comprise transparent hood portion 13 (or including a transparent region shown by dotted line) having a closed end 14 and an open end 15 and which is sized to receive and envelop head and neck of subject 11. Hood portion 13 may terminate at open end 15 in skirt portion 16 of any suitable width for covering a selected part of the lower neck and shoulder region of subject 11. Hood portion 13 may comprise any suitable transparent thin film material as would occur to a skilled artisan guided by these teachings, preferably with suitable anti-fog coatings, and having a desirable degree of resistance to attack by airborne chemicals which may be encountered in toxic environments (such as nerve gas, mustard gas, blood agents, blister agents, hydrogen chloride gas, chlorine gas, cyanic acid, acrolein, ammonia and benzene). Film thickness for hood portion 13 is not considered limiting of the invention, and may be of the order of a few (2–3) mils. Mask 10 may generally be stored or used at temperatures from about −20° F. to 125° F. Suitable materials for hood portion 13 may therefore include single or multiple transparent layers of plastic or other useful commercially available synthetic material such as TEFZEL TM, TEFLON TM, SURLYN TM, nylon, nylon/SURLYN TM laminate, TEFLON TM/KAPTON TM trilaminate, and MYLAR TM, all of which exhibit chemical resistance of more than two hours (a desirable minimum) and, for some, more than 24 hours. Mask 10 may additionally be made substantially flame resistant utilizing materials such as the KAPTON TM, TEFLON TM/KAPTON TM/TEFLON TM trilaminate, or TEFLON TM materials. In a mask 10 built in demonstration of the invention, hood portion 13 comprised transparent nylon (2 mil) because this material is inexpensive, has high light transmission and minimal haze, and heat seals at relatively low temperature. A standard antifog solution was applied to the frontal vision area of the demonstration mask 10.

Elastic band 19 of suitable width (e.g. one inch) encircles hood portion 13 at skirt portion 16, is sewn, sealed or otherwise suitably attached to the material of hood portion 13 and includes closure means, such as a hook 20 and loop 21 VELCRO TM clasp, for releaseably and resiliently securing and sealing hood portion 13 around the neck of subject 11. With mask 10 in place over the head and neck as suggested in FIG. 1, band 19 may be tightened about the neck sufficiently to maintain within hood portion 13 a slight positive pressure but to not substantially restrict exhalation by subject 11 through the seal at the neck so established by tightening band 19. A neck dam (not shown) may be used in place of band 19 at somewhat higher overall cost.

Figure 2:
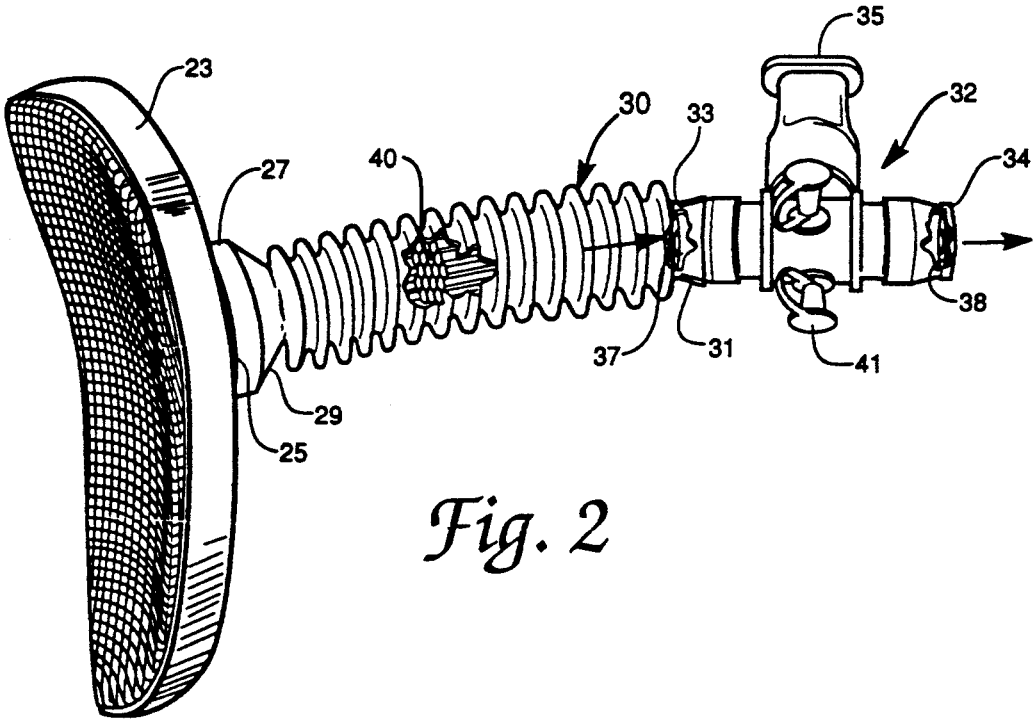
FIG. 2 is an enlarged view of the filter, connecting tube and mouthpiece assembly of the FIG. 1 embodiment.

Referring additionally to FIG. 2, shown therein is an enlarged view of the filter, connecting tube and mouthpiece assembly of mask 10 of FIG. 1. In order to accommodate attachment of filter 23, opening 24 is provided in hood portion 13 to receive outlet 25 of filter 23. Filter 23 may be selected to target one or more noxious airborne substances or toxic environments such as those suggested above, to provide a desired degree of effective respiratory protection for time periods in the range of from about 15 minutes to 10 hours, limited only by filter 23 effectiveness. In the demonstration unit, filter 23 comprised a standard military M-13A2 filter (NSN 4240001655026) of known effectiveness for removing chemical and biological agents, including nerve, blood and blister types, and particulate matter. Convenient size, flexibility and almost flat aspect ratio of this filter rendered it a good choice for the demonstration unit as it, in combination with hood portion 13 could be folded for insertion into a pocket of a garment (e.g. flight suit) worn by subject 11. Outlet 25 of filter 23 has a protruding flanged ring 27 for providing an airtight seal against hood portion 23 at opening 24 and sealably receiving a first inlet end 29 of flexible connecting tube 30 sized in diameter and length for passing filtered air from filter 23 to subject 11. Material selection for connecting tube 30 is not critical because in using mask 10, tube 30 is not exposed to the ambient toxic environment. Tube 30 of the demonstration unit comprised medical grade silicone rubber because of its characteristically good shelf life and ability both to endure temperature extremes without substantial degradation of performance and to retain a desired shape after folding. Connecting tube 30 terminates at its second outlet end 31 with T-shaped member 32 having inlet 33, outlet 34 and defining mouthpiece 35 means at the three respective ends thereof. In the demonstration unit, a standard respiratory care type member 32 (Baxter #001500, AIR-LIFE TM, American Pharmaseal Co., American Hospital Supply Corp., Valencia CA) and mouthpiece 35 were used. One-way flow valves 37,38 were disposed in member 32 at respective inlet 33 and outlet 34 ends thereof, for allowing air flow only in the direction indicated by the arrows, viz, inwardly toward subject 11 at inlet 33 and outwardly away from subject 11 at outlet 34. The small volumetric size of member 32 as compared to that of hood portion 13 minimizes dead space into which subject 11 breathes in the use of mask 10 and ensures that subject 11 breathes only filtered air and exhales carbon dioxide and water vapor rich but contaminate free air into hood portion 13 and maintains therein a positive pressure over the ambient atmosphere.

In order to provide additional protection against smoke and fumes from a burning source, a carbon monoxide catalyst/honeycomb 40 or similar means may be included in connecting tube 30, as suggested in FIG. 2, or other convenient location in the inspiratory circuit. Additionally, an optional water vapor absorbent filter may be connected to member 32 such as at 41 in FIG. 2 in order to add water vapor to inhaled air and extract it from exhaled air. The water vapor filter may also be included in the exhale only portion of the circuit. An optional one-way valve 43 of preselected low resistance may be inserted in the wall of hood portion 13 as suggested in FIG. 1 in order to assist or replace the neck seal for maintaining desired preselected pressurization within hood portion 13 during use of mask 10. Further, a silica gel packet 45 or other suitable moisture absorbent means may be disposed at any convenient location within hood portion 13 for reducing the relative humidity of exhaled air within mask 10.

Tests were run in demonstration of the invention utilizing the demonstration unit described above. A test chamber was charged with a concentration of 25 $mg/m^3$ of corn oil in the form of a polydispersed aerosol having a mass mean aerodynamic diameter of 0.5–0.6 micron, by atomizing liquid corn oil at room temperature using a Laskin nozzle. The aerosol concentration was maintained by diluting the concentrated aerosol with room air. Three subjects wearing the demonstration mask performed certain exercises within the test chamber, including normal breathing, deep breathing, head side-to-side, head up and down, run in place and touch ceiling and floor. Each exercise was performed for one minute with a total wear time of ten minutes for each subject. Leakage of aerosol into the mask was measured by continuously sampling at a rate of one liter/min through a length of tubing interconnecting hood portion 13 and a five-decade forward-light scattering photometer. A protection factor (ratio of test chamber aerosol concentration to hood concentration) was determined for each exercise along with a mean overall protection factor for all the tests. The tests indicated that an overall protection factor of at least 1000:1 is characteristic of the invention as exemplified by the demonstration unit. Depending on the ability of the subject to function during the tests, a large protection factor of the order of 20,000:1 was achieved over the full range of activity under the tests. Speech intelligibility of a subject while wearing the demonstration unit approached 100% at up to 10 feet; use of a telephone by the subject was not substantially impaired by the mask.

Figure 3:
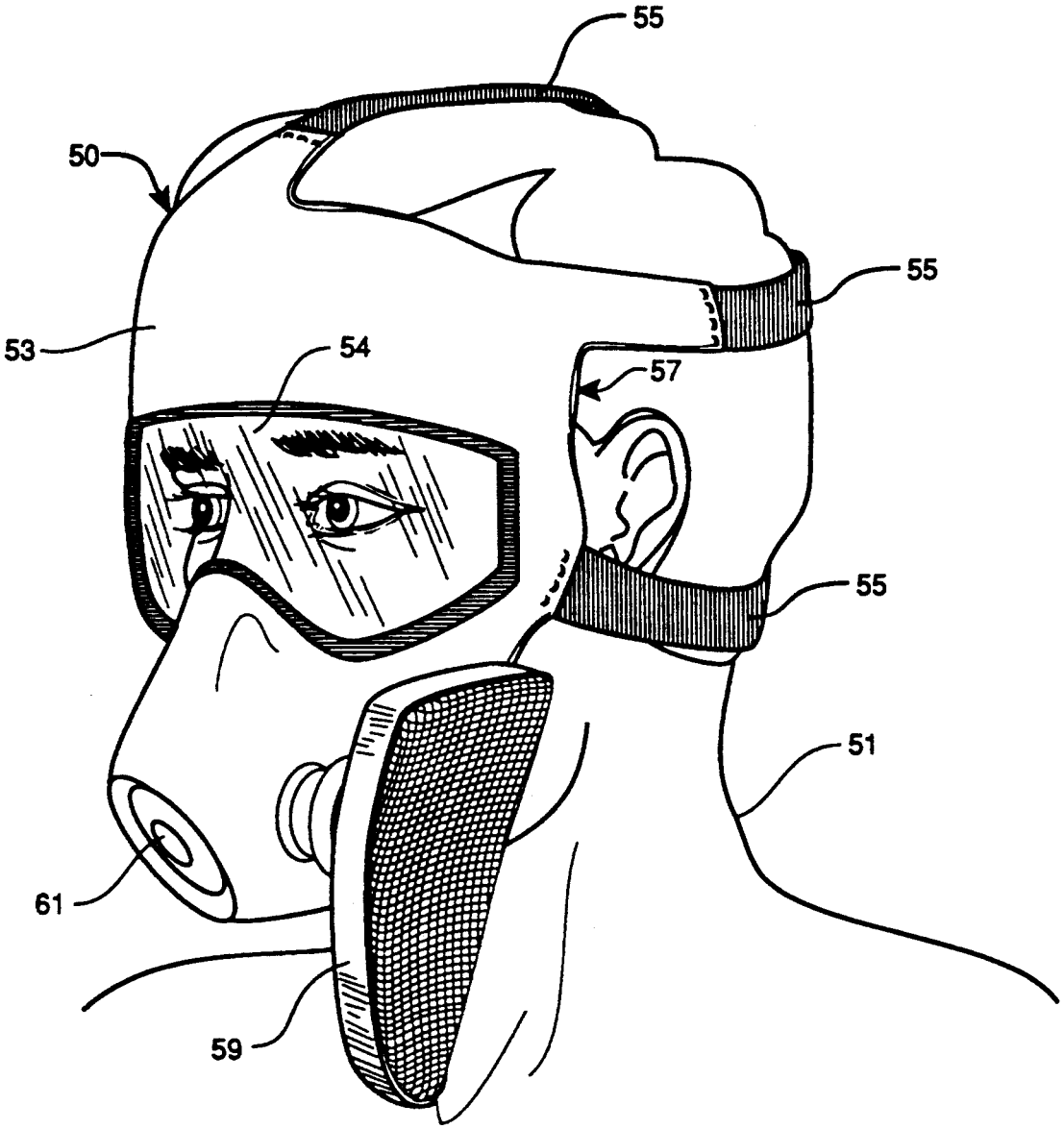
FIG. 3 is a perspective view of a second embodiment of the invention as worn by a subject.

Referring now to FIG. 3, shown therein is a perspective view of mask 50 representing another embodiment of the invention as worn by subject 51. Mask 50 of FIG. 3 may substantially resemble a conventional gas mask including a flexible protective body portion 53 covering the eyes, nose and mouth of subject 51, and having a transparent window portion 54 and elastic straps 55 in order to provide a substantially airtight peripheral seal 57. Materials of construction may be selected according to the teachings above related to mask 10 of FIG. 1. A filter 59 substantially the same as filter 23 of the FIG. 1 embodiment is operatively attached to body portion 53 in manner substantially as described above for filter 23 and hood portion 13. A connecting tube, T shaped member, mouthpiece and filters (not shown in FIG. 3) in substantially the configuration shown in FIG. 2 is included inside body portion 53 and operatively connected to filter 59. One-way valve 61 of preselected low resistance may be disposed in the wall of body portion 53 for maintaining desired preselected pressurization within mask 50.

The invention therefore provides an improved respiratory protection mask. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A respiratory protective mask, comprising:

(a) a transparent covering for the eyes, nose and mouth of a subject, said covering having a peripheral seal for preventing air leakage around said covering into the region defined between said covering and said subject;

(b) filter means attached to said covering for filtering and conducting air through said covering;

(c) a tube operatively connected at a first inlet end thereof to said filter means and including means defining a mouthpiece at a second outlet end thereof for conducting filtered air to said mouth of said subject;

(d) first one-way valve means disposed within said tube for conducting said filtered air only toward said mouthpiece defining means; and (e) second one-way valve means included in said mouthpiece defining means for conducting air only from said mouth of said subject and into said region whereby air exhaled by said subject generates an overpressure condition within said region.

2. The mask of claim 1 wherein said covering comprises a hood sized for enveloping the head of said subject with said peripheral seal at the neck of said subject.

3. The mask of claim 1 wherein said covering comprises a chemically resistant thin film material.

4. The mask of claim 1 further comprising a third one-way valve in said covering for selectively limiting the overpressure within said region.

5. The mask of claim 1 further comprising a carbon monoxide oxidation catalyst disposed within said tube.

6. The mask of claim 1 further comprising a water vapor absorbent material disposed on said covering within said region.

7. The mask of claim 1 further comprising an anti-fogging coating on said covering.

8. A respiratory protective mask, comprising:

(a) a hood having an opening for receiving and enveloping the head and neck of a subject, said hood including a transparent portion alignable with the eyes of said subject;

(b) an adjustable elastic band on said hood at said opening for resiliently sealing said hood at the neck of said subject for preventing air leakage into the interior of said hood;

(c) filter means attached to said hood for filtering and conducting air through said hood;

(d) a tube operatively connected at a first inlet end thereof to said filter means and including means defining a mouthpiece at a second outlet end thereof for conducting filtered air to said mouth of said subject;

(e) first one-way valve means disposed within said tube for conducting said filtered air only toward said mouthpiece defining means; and (f) second one-way valve means included in said mouthpiece defining means for conducting air only from said mouth of said subject and into said hood whereby air exhaled by said subject generates an overpressure condition within said hood.

9. The mask of claim 8 wherein said hood comprises a chemically resistant thin film material.

10. The mask of claim 8 further comprising a third one-way valve in said hood for selectively limiting the overpressure within said hood.

11. The mask of claim 8 further comprising a carbon monoxide oxidation catalyst disposed within said tube.

12. The mask of claim 8 further comprising a water vapor absorbent material disposed within said hood.

13. The mask of claim 8 further comprising an anti-fogging coating on said hood.

* * * * *